United States Patent
Chen et al.

(10) Patent No.: US 9,284,489 B2
(45) Date of Patent: Mar. 15, 2016

(54) METHOD OF MANUFACTURING POLYMER DISPERSED LIQUID CRYSTAL

(71) Applicant: CHUNGHWA PICTURE TUBES, LTD., Taoyuan (TW)

(72) Inventors: Jian-Hua Chen, Changhua County (TW); Chun-Wei Su, New Taipei (TW)

(73) Assignee: CHUNGHWA PICTURE TUBES, LTD., Taoyuan (TW)

(*) Notice: Subject to any disclaimer, the term of this patent is extended or adjusted under 35 U.S.C. 154(b) by 174 days.

(21) Appl. No.: 14/133,665

(22) Filed: Dec. 19, 2013

(65) Prior Publication Data

US 2015/0123031 A1     May 7, 2015

(30) Foreign Application Priority Data

Nov. 7, 2013   (TW) .............. 102140497 A

(51) Int. Cl.
    *C09K 19/54*         (2006.01)

(52) U.S. Cl.
    CPC ..................... *C09K 19/544* (2013.01)

(58) Field of Classification Search
    CPC ................ C09K 19/544; C09K 19/3809
    See application file for complete search history.

(56) References Cited

U.S. PATENT DOCUMENTS

2006/0119917 A1   6/2006   Sutherland et al.

FOREIGN PATENT DOCUMENTS

| CN | 1803979 A | 7/2006 |
|---|---|---|
| CN | 102087440 A | 6/2011 |
| CN | 102243330 A | 11/2011 |
| CN | 102321205 A | 1/2012 |
| CN | 102898758 A | 1/2013 |
| CN | 103278959 A | 9/2013 |
| JP | 2001-272665 | 10/2001 |
| JP | 2011105902 A | 6/2011 |

OTHER PUBLICATIONS

English translation by machine-generated for CN102321205 provided bt EPO, 2011.*

* cited by examiner

*Primary Examiner* — Shean C Wu
(74) *Attorney, Agent, or Firm* — CKC & Partners Co., Ltd.

(57) ABSTRACT

A method of manufacturing polymer dispersed liquid crystal includes: mixing liquid crystal, a first photopolymerizable material, a first photoinitiator, a second photopolymerizable material and a second photoinitiator to form a mixture, in which the first photoinitiator is capable to initiate polymerization of the first photopolymerizable material by irradiating a first ultraviolet light, and the second photoinitiator is capable to initiate polymerization of the second photopolymerizable material by irradiating a second ultraviolet light, and the first ultraviolet light has a wavelength different from that of the second ultraviolet light. The first photopolymerizable material is polymerized by irradiating the first ultraviolet light to form a plurality of first liquid crystal droplets. The second photopolymerizable material is polymerized by irradiating the second ultraviolet light to form a plurality of second liquid crystal droplets dispersed between the first liquid crystal droplets.

9 Claims, 4 Drawing Sheets

METHOD OF MANUFACTURING POLYMER DISPERSED LIQUID CRYSTAL

RELATED APPLICATIONS

This application claims priority to Taiwanese Application Serial Number 102140497, filed Nov. 7, 2013, which is herein incorporated by reference.

BACKGROUND

1. Field of Invention

The present invention relates to a method of manufacturing polymer dispersed liquid crystal.

2. Description of Related Art

Polymer dispersed liquid crystal (PDLC) is prepared by uniformly mixing liquid crystal and a polymerizable monomer or oligomer, and then performing polymerization under certain conditions for initiating the polymerization to form micron-level liquid crystal droplets uniformly dispersed in the polymer. Because of optical characteristics of the liquid crystal, the PDLC may be modulated to a transparent state or a scattering state by applying a voltage. Properties of the PDLC have been widely applied in the fields of transparent display devices and flexible display devices.

However, a distribution density of the liquid crystal droplets of the current PDLC is insufficient, which results in high transmittance of the scattering state and thus leads to a low contrast. Accordingly, at present, how to improve the contrast of the PDLC becomes an important issue.

SUMMARY

An aspect of the present invention provides a method of manufacturing polymer dispersed liquid crystal, which is able to effectively increase a distribution density of liquid crystal droplets and thus to enhance haze of a scattering state, such that a contrast ratio may be increased. The manufacturing method includes: mixing liquid crystal, a first photopolymerizable material, a first photoinitiator, a second photopolymerizable material and a second photoinitiator to form a mixture, in which the first photoinitiator is capable to initiate polymerization of the first photopolymerizable material by irradiating a first ultraviolet light, and the second photoinitiator is capable to initiate polymerization of the second photopolymerizable material by irradiating a second ultraviolet light, and the first ultraviolet light has a wavelength different from a wavelength of the second ultraviolet light. The first photopolymerizable material of the mixture is polymerized by irradiating the first ultraviolet light to form a plurality of first liquid crystal droplets. The second photopolymerizable material of the mixture is polymerized by irradiating the second ultraviolet light to form a plurality of second liquid crystal droplets dispersed between the first liquid crystal droplets.

According to one embodiment of the present invention, the second photopolymerizable material has a viscosity less than a viscosity of the first photopolymerizable material.

According to one embodiment of the present invention, the viscosity of the first photopolymerizable material is in a range from 60 $mm^2S^{-1}$ to 100 $mm^2S^{-1}$ (20° C.), and the viscosity of the second photopolymerizable material is less than 60 $mm^2S^{-1}$ (20° C.).

According to one embodiment of the present invention, the viscosity of the first photopolymerizable material is in a range from 60 $mm^2S^{-1}$ to 100 $mm^2S^{-1}$ (20° C.), and the viscosity of the second photopolymerizable material is in a range from 20 $mm^2S^{-1}$ to 50 $mm^2S^{-1}$ (20° C.).

According to one embodiment of the present invention, the liquid crystal has an amount of 56 to 89.8 wt % based on the total weight of the mixture, and the first photopolymerizable material, the first photoinitiator, the second photopolymerizable material and the second photoinitiator have an amount of 10.2 to 44 wt % based on the total weight of the mixture.

According to one embodiment of the present invention, the first photopolymerizable material has an amount of 5 to 20 wt % based on the total weight of the mixture, and the first photoinitiator has an amount of 0.1 to 2 wt % based on the total weight of the mixture, and the second photopolymerizable material has an amount of 5 to 20 wt % based on the total weight of the mixture, and the second photoinitiator has an amount of 0.1 to 2 wt % based on the total weight of the mixture.

According to one embodiment of the present invention, the first photopolymerizable material is trimethylolpropane ethoxylate triacrylate, and the second photopolymerizable material is epoxy acrylate oligomer.

According to one embodiment of the present invention, the first photoinitiator is diphenyl(2,4,6-trimethylbenzoyl)-phosphine oxide, and the second photoinitiator is 2-benzyl-2-(dimethylamino-4-morpholinobutyrophenone.

According to one embodiment of the present invention, the wavelength of the first ultraviolet light is in a range from 360 nm to 370 nm, and the wavelength of the second ultraviolet light is in a range from 310 nm to 320 nm.

According to one embodiment of the present invention, each of the second liquid crystal droplets has a particle size less than or equal to a particle size of each of the first liquid crystal droplets.

BRIEF DESCRIPTION OF THE DRAWINGS

The invention can be more fully understood by reading the following detailed description of the embodiment, with reference made to the accompanying drawings as follows.

DETAILED DESCRIPTION

An aspect of the present invention provides a method of manufacturing polymer dispersed liquid crystal (PDLC), that two or more kinds of photopolymerizable materials are sequentially polymerized to form a plurality of liquid crystal droplets with various sizes in polymer to increase a distribution density of the liquid crystal droplets. Therefore, haze of a scattering state is increased to increase contrast. The method of manufacturing the PDLC will be described below in detail. FIGS. 1A-1E are cross-sectional views at various stages of manufacturing the PDLC according to various embodiments of the present invention.

Figure 1A:
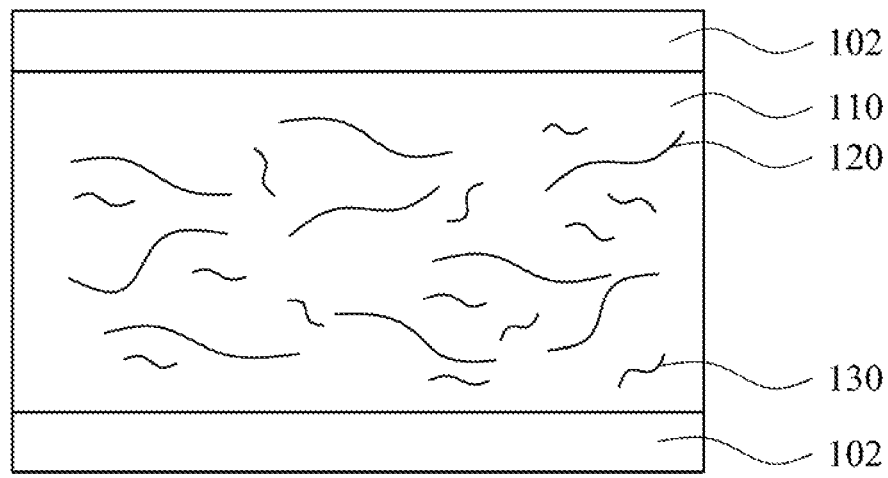
FIGS. 1A-1E are cross-sectional views at various stages of manufacturing polymer dispersed liquid crystal according to various embodiments of the present invention.

As shown in FIG. 1A, liquid crystal 110, a first photopolymerizable material 120, a first photoinitiator, a second photopolymerizable material 130 and a second photoinitiator are mixed to form a uniform mixture. Any conventional mixing device may be used to mix the above-mentioned materials to form the mixture. Subsequently, in one embodiment, the mixture is filled between two substrates 102, and a first ultraviolet light irradiation step and a second ultraviolet light irradiation step are then sequentially performed.

Usable materials for the liquid crystal, the first photopolymerizable material, the first photoinitiator, the second photopolymerizable material and the second photoinitiator will be exemplified below. The liquid crystal may be nematic liquid crystal or other suitable materials.

The first and second photopolymerizable materials may be different kinds of photopolymerizable monomers or oligomers. The first and second photopolymerizable materials may be double bond-containing compounds, epoxy group-containing compounds or a combination thereof. The double bond-containing compounds may contain an acryl group or an isocyanate group, but not limited thereto. The acryl group-containing compounds may be acrylic resin, polyurethane acrylate, polyester acrylate, polyether acrylate, epoxy acrylate or a combination thereof. The epoxy group-containing compounds may be epoxy resin, epoxy acrylate or a combination thereof.

The first photoinitiator is capable to initiate polymerization of the first photopolymerizable material by irradiating the first ultraviolet light, and the second photoinitiator is capable to initiate polymerization of the second photopolymerizable material by irradiating the second ultraviolet light. In order not to perform polymerization of the second photopolymerizable material during irradiating the first ultraviolet light, a wavelength of the first ultraviolet light should be different from that of the second ultraviolet light. The first and second photoinitiators may be 2,2-diethoxyacetophenone, benzophenone, 1-hydroxycyclohexyl phenyl ketone, diethyl thioxanthone, 2-hydroxy-2-methyl-1-phenylpropane-1-one, 1-(4-isopropylphenyl)-2-hydroxy-2-methylpropane-1-one, 2-benzyl-2-(dimethylamino)-4-morpholinobutyrophenone and diphenyl(2,4,6-trimethylbenzoyl)-phosphine oxide, but not limited thereto.

In a specific embodiment, the first photopolymerizable material is trimethylolpropane ethoxylate triacrylate, and the first photoinitiator is diphenyl(2,4,6-trimethylbenzoyl)-phosphine oxide, and the wavelength of the first ultraviolet light is in a range from 360 nm to 370 nm. In the specific embodiment, the second photopolymerizable material is epoxy acrylate oligomer, and the second photoinitiator is 2-benzyl-2-(dimethylamino)-4-morpholinobutyrophenone, and the wavelength of the second ultraviolet light is in a range from 310 nm to 320 nm. However, the specific embodiment exemplified above is just an example, and the present invention is not limited thereto.

Figure 1B:
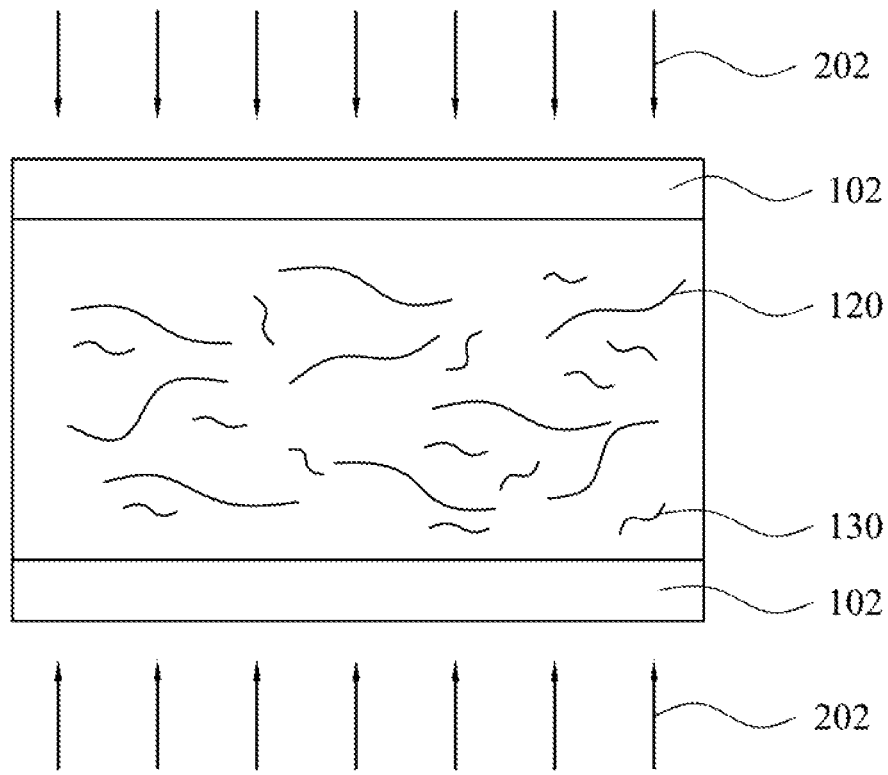
Figure 1C:
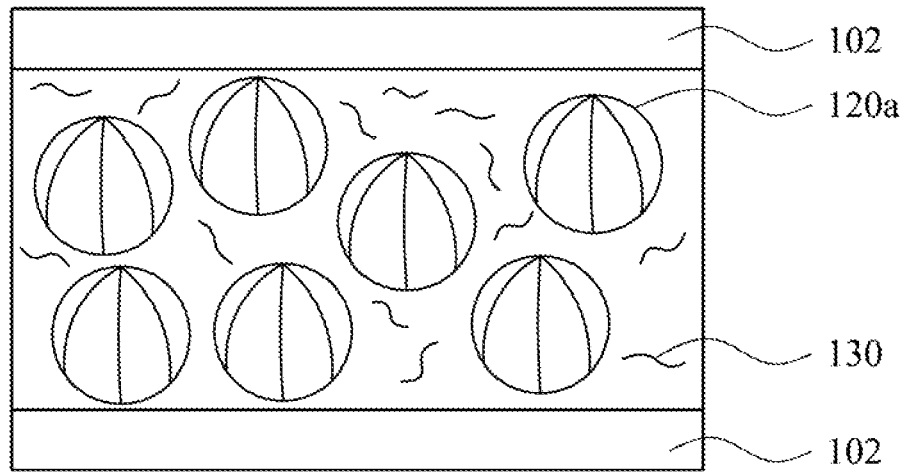

As shown in FIGS. 1B-1C, the first ultraviolet light 202 irradiation step is performed to let the first photopolymerizable material 120 of the mixture start polymerization, which is initiated by the first photoinitiator, so as to form a plurality of first liquid crystal droplets 120a. The wavelength of the first ultraviolet light 202 may be selected according to materials and reaction characteristics of the first photopolymerizable material 120 and the first photoinitiator. This step may be performed using an UV illuminator, which generally includes a light source, an illuminator, a cooling means and a power supply unit. The light source may be a high-pressure mercury lamp, ozone-free mercury lamp, xenon lamp, melting lamp or metal halide lamp.

Figure 1D:
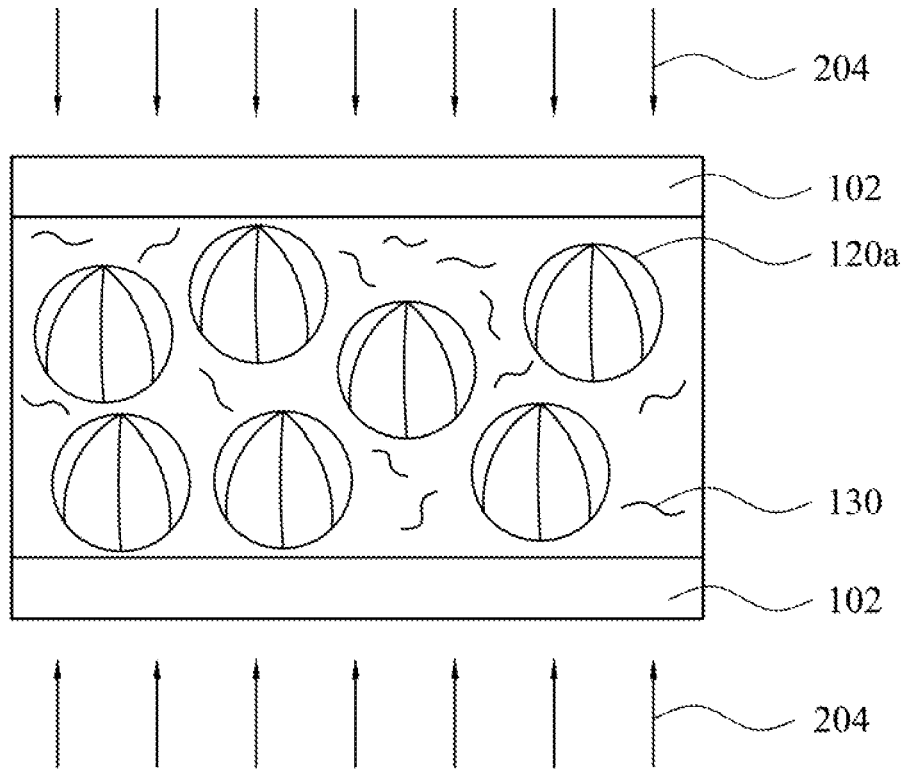
Figure 1E:
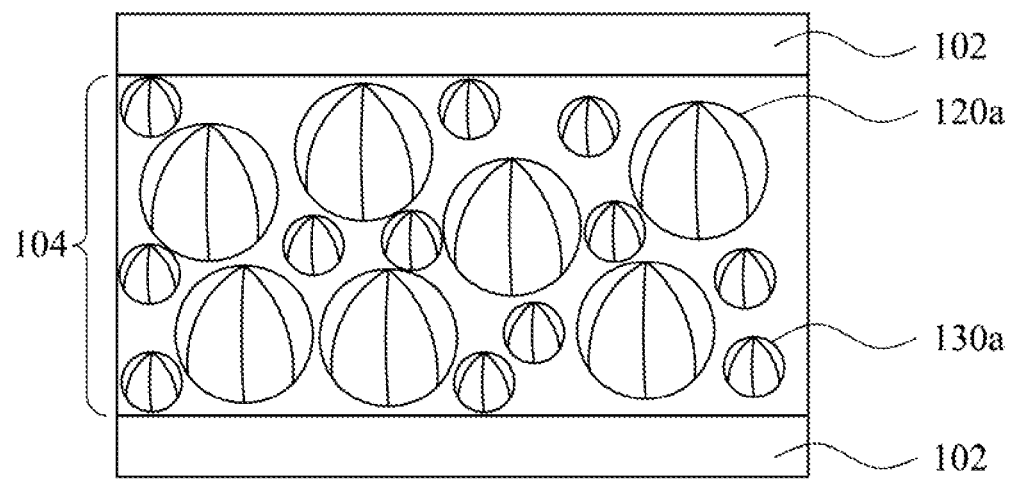

As shown in FIGS. 1D-1E, the second ultraviolet light 204 irradiation step is performed to let the second photopolymerizable material 130 of the mixture start polymerization, which is initiated by the second photoinitiator, so as to form a plurality of second liquid crystal droplets 130a dispersed between the first liquid crystal droplets 120a. The wavelength of the second ultraviolet light 204 may be selected according to materials and reaction characteristics of the second photopolymerizable material 130 and the second photoinitiator. This step may also be performed using the UV illuminator. It is noteworthy that haze of the scattering state may be increased to enhance the contrast since the distribution density of the liquid crystal droplets is further increased due to the presence of second liquid crystal droplets 130a. In addition, the second photopolymerizable material 130 is polymerized limited by three-dimensional structures of the first liquid crystal droplets 120a, such that a particle size of the formed second liquid crystal droplet 130a may be less than or equal to that of the first liquid crystal droplet 120a.

In one embodiment, a viscosity of the second photopolymerizable material 130 may preferably be less than a viscosity of the first photopolymerizable material 120 in order to let the second photopolymerizable material 130 still easily polymerized after the first liquid crystal droplets 120a are formed. In one embodiment, the viscosity of the first photopolymerizable material 120 is in a range from 60 $mm^2S^{-1}$ to 100 $mm^2S^{-1}$ (20° C.), and the viscosity of the second photopolymerizable material 130 is less than 60 $mm^2S^{-1}$ (20° C.).

In one embodiment, the viscosity of the first photopolymerizable material 120 is in a range from 60 $mm^2S^{-1}$ to 100 $mm^2S^{-1}$ (20° C.), and the viscosity of the second photopolymerizable material 130 is in a range from 20 $mm^2S^{-1}$ to 50 $mm^2S^{-1}$ (20° C.).

A ratio of the liquid crystal, the first photopolymerizable material, the first photoinitiator, the second photopolymerizable material and the second photoinitiator may be appropriately adjusted. In one embodiment, the liquid crystal has an amount of 56 to 89.8 wt % based on the total weight of the mixture, and the first photopolymerizable material, the first photoinitiator, the second photopolymerizable material and the second photoinitiator have an amount of 10.2 to 44 wt % based on the total weight of the mixture. It is because when the liquid crystal has an amount lower than 56 wt %, less liquid crystal droplets are formed due to less amount of the liquid crystal; when the liquid crystal has an amount greater than 89.8 wt %, a very small amount of polymer is formed due to less amount of the photopolymerizable materials, such that phase separation with the liquid crystal cannot be effectively performed to form the liquid crystal droplets.

In another aspect, the ratio of the first and second photopolymerizable materials may be adjusted to obtain good distribution of the liquid crystal droplets and high distribution density thereof. The amounts of the first and second photoinitiators may be appropriately selected depending on the amounts of the first and second photopolymerizable materials. Generally, the amount of the photoinitiator may be in a range from 0.5 to 10 wt % based on the weight of the photopolymerizable material. In one embodiment, the first photopolymerizable material has an amount of 5 to 20 wt % based on the total weight of the mixture, and the first photoinitiator has an amount of 0.1 to 2 wt % based on the total weight of the mixture, and the second photopolymerizable material has an amount of 5 to 20 wt % based on the total weight of the mixture, and the second photoinitiator has an amount of 0.1 to 2 wt % based on the total weight of the mixture. However, the embodiment exemplified above is just an example, and the present invention is not limited thereto.

Furthermore, as shown in FIG. 1E, the first liquid crystal droplets 120a, the second liquid crystal droplets 130a, a product polymerized from the first photopolymerizable material 120 and a product polymerized from the second photopolymerizable material 130 constitute a PDLC layer 104. The PDLC layer 104 and a display panel may constitute a high contrast display device, and thus to widely applied in the fields of transparent display devices (e.g., electrically controlled glass) and flexible display devices (e.g., EBook). For instance, the two substrates 102 of FIGS. 1A-1E may respectively be a thin film transistor array substrate and a color filter substrate, or a color filter on array (COA) substrate/array on color filter (AOC) substrate and a substrate without color filters. Therefore, the PDLC layer 104 and the two substrates 102 may constitute a PDLC display device 100. The substrate 102 may include a transparent electrode (not shown). Positions of the transparent electrodes may be determined based on an electric driving mode. The electric driving mode may be twisted nematic (TN) or in-plane switching (IPS). The transparent electrodes may be made of indium tin oxide (ITO), aluminum zinc oxide (AZO), aluminum tin oxide (ATO), gallium zinc oxide (GZO), indium titanium oxide (ITiO), indium molybdenum oxide (IMO) or other transparent conductive materials. Such PDLC display device may exhibit high brightness since there is no need for a polarizing plate.

Comparative Example 1

Figure 2:
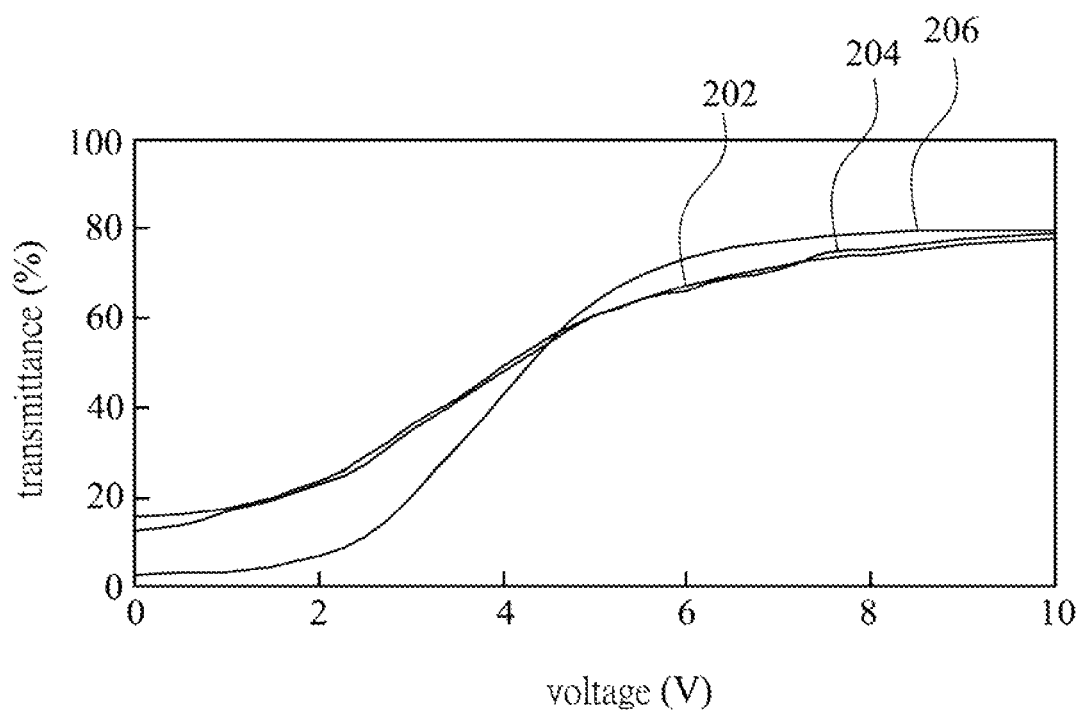
FIG. 2 is a relationship diagram between transmittance and applied voltage of Comparative Example 1, Comparative Example 2 and Example 1.

Nematic liquid crystal, trimethylolpropane ethoxylate triacrylate and diphenyl(2,4,6-trimethylbenzoyl)-phosphine oxide were provided, and a weight ratio thereof was 56-89.8:10-40:0.2-4. PDLC was formed after sequentially mixing and irradiating ultraviolet light with a wavelength of 365 nm. The PDLC was then tested to obtain an optical characteristic curve 202 shown in FIG. 2. Transmittance of the scattering state of the PDLC was about 17%, and transmittance of the transparent state was about 78%.

Comparative Example 2

Nematic liquid crystal, trimethylolpropane ethoxylate triacrylate, diphenyl(2,4,6-trimethylbenzoyl)-phosphine oxide, epoxy acrylate oligomer and 2-benzyl-2-(dimethylamino)-4-morpholinobutyrophenone were provided, and a weight ratio thereof was 56-89.8:5-20:0.1-2:5-20:0.1-2. PDLC was formed after sequentially mixing and irradiating ultraviolet light with a wavelength of 365 nm. The PDLC was then tested to obtain an optical characteristic curve 204 of FIG. 2. Transmittance of the scattering state of the PDLC was about 16%, and transmittance of the transparent state was about 78%.

Example 1

A composition, which is same as that of Comparative Example 2, was provided. PDLC was formed after sequentially mixing, irradiating ultraviolet light with a wavelength of 365 nm and irradiating ultraviolet light with a wavelength of 313 nm. The PDLC was then tested to obtain an optical characteristic curve 206 of FIG. 2. Transmittance of the scattering state of the PDLC was about 3%, and transmittance of the transparent state was about 80%.

Given the results of Comparative Example 1, Comparative Example 2 and Example 1, to irradiate ultraviolet light with the wavelength of 313 nm may let the liquid crystal precipitate more liquid crystal droplets, and thus transmittance of the scattering state may be reduced to 3% from 16-17%. The results proved that the scattering state of the PDLC, which is manufactured by the method for manufacturing the PDLC of the present invention, indeed exhibits very low transmittance (i.e., high haze), and thus the contrast can be significantly enhanced.

It will be apparent to those ordinarily skilled in the art that various modifications and variations may be made to the structure of the present invention without departing from the scope or spirit of the invention. In view of the foregoing, it is intended that the present invention cover modifications and variations thereof provided they fall within the scope of the following claims.

What is claimed is:

1. A method of manufacturing polymer dispersed liquid crystal, the method comprising:
   mixing liquid crystal, a first photopolymerizable material, a first photoinitiator, a second photopolymerizable material and a second photoinitiator to form a mixture, wherein the first photoinitiator is configured to initiate polymerization of the first photopolymerizable material by irradiating a first ultraviolet light, and the second photoinitiator is configured to initiate polymerization of the second photopolymerizable material by irradiating a second ultraviolet light, and the first ultraviolet light has a wavelength different from a wavelength of the second ultraviolet light;
   polymerizing the first photopolymerizable material of the mixture by irradiating the first ultraviolet light to form a plurality of first liquid crystal droplets; and
   polymerizing the second photopolymerizable material of the mixture by irradiating the second ultraviolet light to form a plurality of second liquid crystal droplets dispersed between the first liquid crystal droplets, wherein each of the second liquid crystal droplets has a particle size less than or equal to a particle size of each of the first liquid crystal droplets.

2. The method of claim 1, wherein the second photopolymerizable material has a viscosity less than a viscosity of the first photopolymerizable material.

3. The method of claim 2, wherein the viscosity of the first photopolymerizable material is in a range from 60 $mm^2S^{-1}$ to 100 $mm^2S^{-1}$ (20° C.), and the viscosity of the second photopolymerizable material is less than 60 $mm^2S^{-1}$ (20° C.).

4. The method of claim 2, wherein the viscosity of the first photopolymerizable material is in a range from 60 $mm^2S^{-1}$ to 100 $mm^2S^{-1}$ (20° C.), and the viscosity of the second photopolymerizable material is in a range from 20 $mm^2S^{-1}$ to 50 $mm^2S^{-1}$ (20° C.).

5. The method of claim 1, wherein the liquid crystal has an amount of 56 to 89.8 wt % based on the total weight of the mixture, and the first photopolymerizable material, the first photoinitiator, the second photopolymerizable material and the second photoinitiator have an amount of 10.2 to 44 wt % based on the total weight of the mixture.

6. The method of claim 5, wherein the first photopolymerizable material has an amount of 5 to 20 wt % based on the total weight of the mixture, and the first photoinitiator has an amount of 0.1 to 2 wt % based on the total weight of the mixture, and the second photopolymerizable material has an amount of 5 to 20 wt % based on the total weight of the mixture, and the second photoinitiator has an amount of 0.1 to 2 wt % based on the total weight of the mixture.

7. The method of claim 1, wherein the first photopolymerizable material is trimethylolpropane ethoxylate triacrylate, and the second photopolymerizable material is epoxy acrylate oligomer.

8. The method of claim 7, wherein the first photoinitiator is diphenyl(2,4,6-trimethylbenzoyl)-phosphine oxide, and the second photoinitiator is 2-benzyl-2-(dimethylamino)-4-morpholinobutyrophenone.

9. The method of claim 8, wherein the wavelength of the first ultraviolet light is in a range from 360 nm to 370 nm, and the wavelength of the second ultraviolet light is in a range from 310 nm to 320 nm.

* * * * *